United States Patent [19]
Waterhouse

[11] Patent Number: 5,943,173
[45] Date of Patent: Aug. 24, 1999

[54] ILLUMINATED MAGNIFIER READING APPARATUS

[76] Inventor: William H. Waterhouse, P.O. Box 722274, Norman, Okla. 73070

[21] Appl. No.: 09/192,423

[22] Filed: Nov. 16, 1998

[51] Int. Cl.[6] .................................................. G02B 27/02
[52] U.S. Cl. ............................................................. 359/802
[58] Field of Search .................................. 359/802, 798, 359/800, 801, 806

[56] References Cited

U.S. PATENT DOCUMENTS

| | | |
|---|---|---|
| 2,056,693 | 10/1936 | Stanley .......................................... 88/39 |
| 2,527,071 | 10/1950 | Pierce ............................................ 88/39 |
| 3,039,350 | 6/1962 | Gollhofer ....................................... 88/1 |
| 5,757,560 | 5/1998 | Fisherman ................................. 359/821 |

*Primary Examiner*—Georgia Epps
*Assistant Examiner*—Ricky Mack
*Attorney, Agent, or Firm*—Robert K. Rhea

[57] ABSTRACT

An illuminated magnifying lens device for reading sales slips in dim light is formed by a planar base supporting a generally horizontal frame in spaced relation above the base. The frame disposes a magnifying lens transversely of the base. A lamp equipped circuit illuminating the lens is energized by an operator lifting a writing instrument out of a support socket.

5 Claims, 2 Drawing Sheets

5,943,173

ILLUMINATED MAGNIFIER READING APPARATUS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to portable reading devices and more particularly to an illuminated reading device which includes a magnifier having a light source supported by its frame.

1. Field of the Invention

Many individuals find it difficult to read items charged and/or the total of sales slips, machine printed in restaurants and other eating establishments where the ambient light is dim. A pocket size flashlight is a convenient aide in such situations but its use has the disadvantage of its inconvenient size and shape and which spreads considerable light, often annoying people in adjacent seats. Even with a flashlight the illumination may be insufficient to permit the reading of fine print.

2. Description of the Prior Art

The prior art discloses a number of devices which have been proposed for use in such situations. For example, U.S. Pat. No. 3,039,350 issued Jun. 19, 1962 for Gollhofer for Magnifying Device. This patent discloses a box frame, triangular in side elevation, supporting a sheet having indicia thereon. A transverse slot in the inclined surface overlies a lamp within the frame to reveal indicia on the sheet magnified by a lens overlying the slot. The paper being moved by a user operated roller moving the sheet line by line over the slot for reading.

U.S. Pat. No. 2,056,093 issued Oct. 6, 1936 to Stanley for Magnifying Lens And Means For Supporting It and U.S. Pat. No. 2,527,071 issued Oct. 24, 1950 to Pierce for Magnifying Attachment For Books are believed examples of the further state-of-the-art.

The Stanley U.S. Pat. No. 2,056,693 discloses a magnifying lens extending between a pair of block supports each containing a battery and a lamp having the light rays directed beneath the overlying lens for magnifying indicia on a paper placed under the reading device.

The Pierce U.S. Pat. No. 2,527,071 discloses an elongated magnifier extending transversely of indicia on the sheets of a book and supported by a frame.

This invention is believed distinctive over the above named patents by providing a planar base having a plurality of support members overlying the base in a cantilever fashion from a marginal edge portion thereof including a magnifying member extending transversely of the base in close spaced relation therewith for magnifying indicia on a sales slip. A plurality of light emitting means energized by a battery powered circuit is energized by the user closing a microswitch.

BRIEF SUMMARY OF THE INVENTION

An elongated rectangular planar base underlies, in vertical spaced relation, a generally horizontal frame. The frame includes a battery support panel connected with a marginal end edge of the base in cantilever fashion for supporting an arm projecting toward the opposite end of the base in cantilever fashion from the support panel which terminates in a U-shaped frame transversely of the base. The U-shape leg members support a magnifier lens in close spaced relation therewith permitting the passage an alpha/numeric bearing sheet to be magnified line by line by the magnifier as the sheet is moved transversely under the magnifier lens. An electric circuit energized by batteries in a battery compartment underlies the frame arm and U-shaped member to illuminate indicia on a sheet overlying the base. A normally open microswitch is closed by the user removing a writing instrument normally maintaining the switch in open position.

The principal object of this invention is to provide an illuminated magnifier for reading alpha/numeric material printed on a sheet moved transversely line by line beneath a magnifier lens.

DETAILED DESCRIPTION OF THE INVENTION

Figure 1:
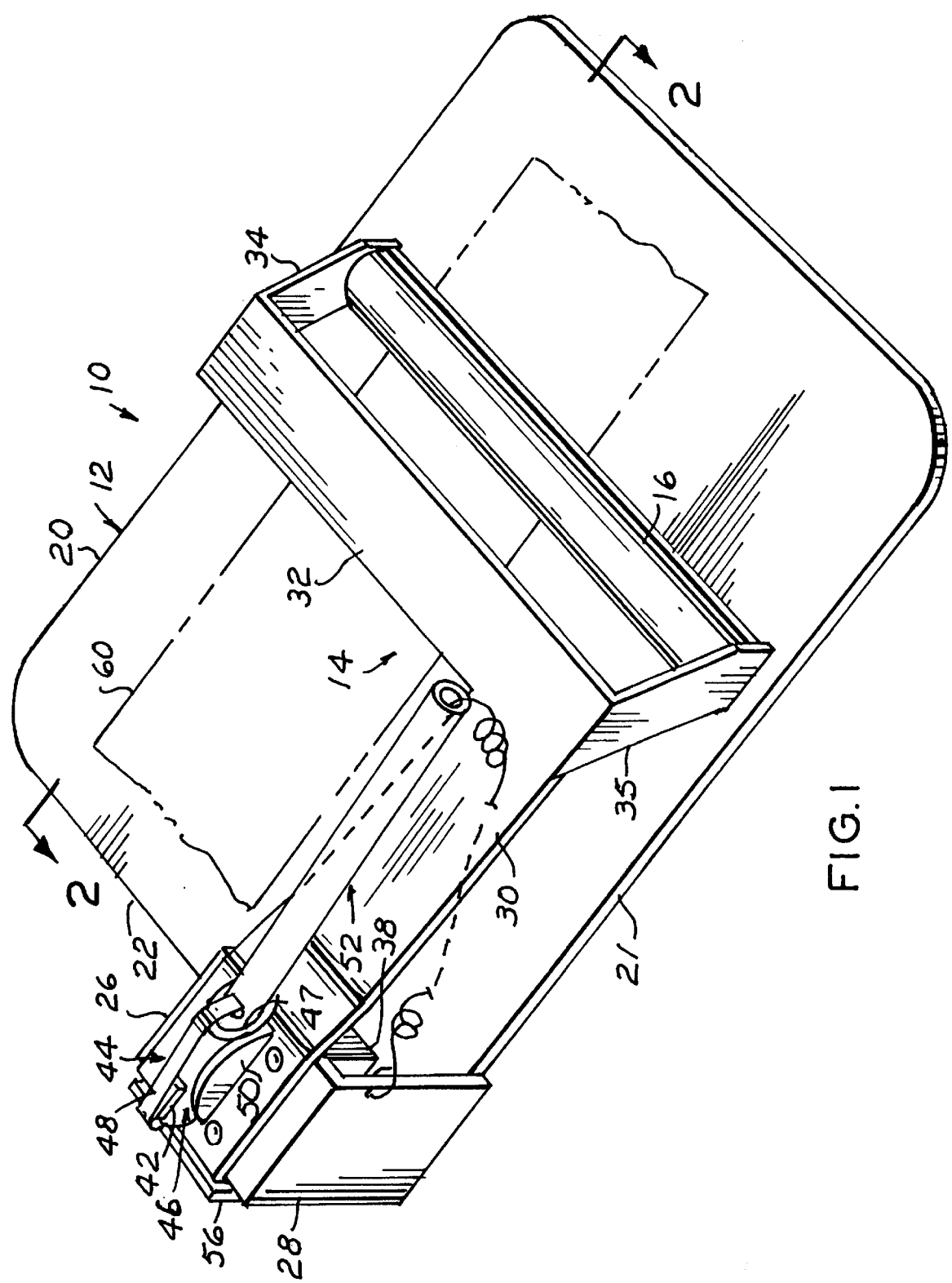
FIG. 1 is a perspective view of the apparatus.
Figure 3:
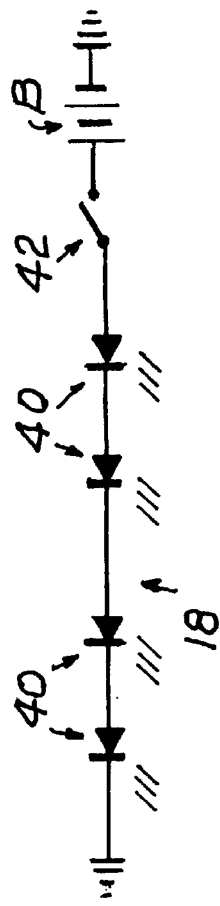

Like characters of reference designate like parts in those figures of the drawings in which they occur.

In the drawings:

The reference numeral 10 indicates the device as a whole which is rectangular in general configuration comprising a base 12 having an upwardly spaced generally horizontal support frame means 14 supporting a magnifying lens 16 transversely of the base, and illuminated by a frame supported circuit means 18. The base 12 is planar having opposing side edges 20–21, opposing end portions 22–23, and a planar top surface 24. The frame means 14 includes a horizontal battery support panel 26 secured in cantilever fashion to the base side edge 21 by an upstanding wall 28 adjacent its forward end portion 22.

A frame arm 30 is connected in cantilever fashion with the battery support panel 26, and extends toward the base end portion 23 terminating in an integrally connected inverted U-shape member having a bight portion 32 extending transversely of the base, intermediate its ends, and parallel leg portions 34 and 35 projecting angularly downward toward the base end portion 23 for supporting the magnifier lens 16 therebetween. The magnifier lens 16 is substantially semi-circular in transverse section having its cord surface 36 disposed in close spaced relation with respect to the upper surface 24 of the base for the purposes presently explained.

The circuit means 18 includes a battery compartment 38 secured to the depending surface of the frame panel 26 and containing one or more batteries B connected in series with a plurality of light emitting members, such as light emitting diodes LED, through a normally open microswitch 42.

Figure 2:
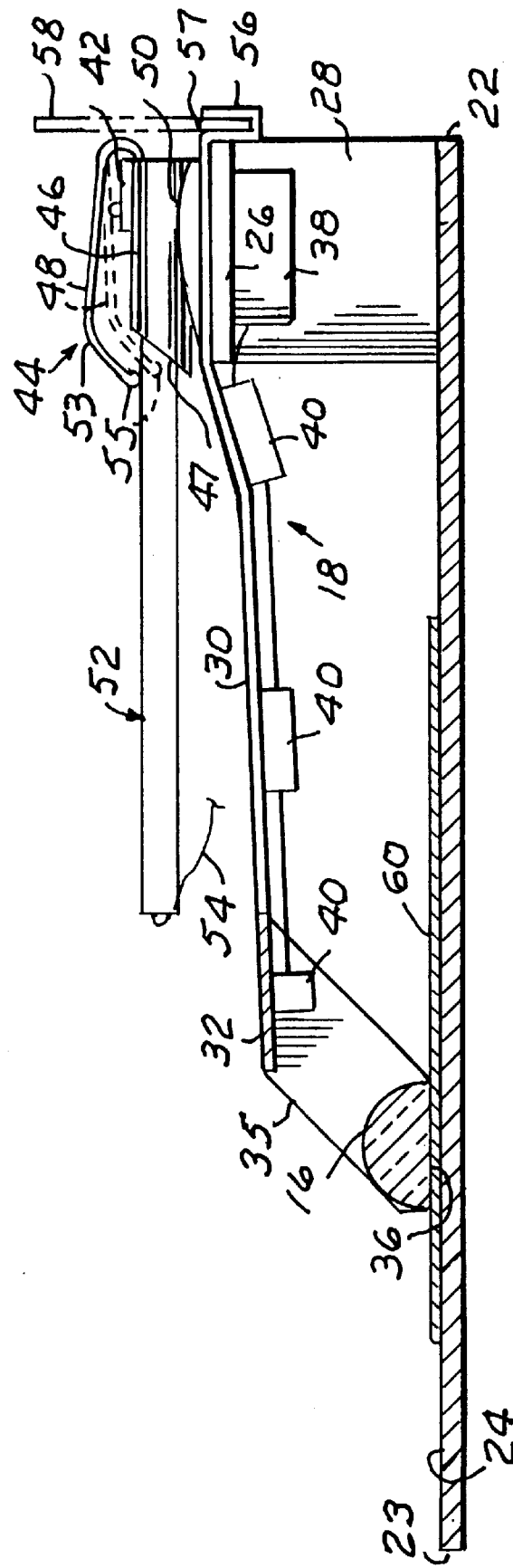
FIG. 2 is a vertical cross sectional view partially in elevation taken substantially along the line 2—2 of FIG. 1; and, FIG. 3 is a wiring diagram.

A circuit control socket means 44 is mounted on the frame panel 26 for energizing the circuit 18 and illuminating the magnifier lens 16. The socket means 44 comprises a socket member 46, such as the cap of a writing instrument having a spring clip 48, with the socket open end 47 projecting toward the base end portion 23 and secured to the frame panel 26 by a bonding member 50. A tubular writing instrument 52 is supported by inserting one end portion into the socket 46. The spring clip 48 is angularly bent downwardly at its free end portion 53 disposing the clip end 55 adjacent the longitudinal axis of the socket 46, as illustrated by dotted lines (FIG. 2). The microswitch 42 is interposed between the clip 48 and the socket outer surface adjacent its closed end which closes the microswitch in the absence of the writing instrument. Inserting the writing instrument 52 in the socket 46 lifts the clip 48 out of contact with the microswitch 42 allowing the microswitch to "open", as illustrated by solid lines (FIG. 2). The writing instrument free end is attached to the frame as by a flexible member 54.

The end portion of the frame arm 30, opposite the inverted U-shaped member, is extended beyond the adjacent edge of the panel 26 and turned downwardly toward the base and doubled back upon itself, as at 56, to form a narrow socket 57 for receiving and supporting one edge portion of a credit card 58 or the like.

OPERATION

In operation, a waiter or clerk places a customer's sales slip 60 on the top surface 24 of the base, and slides one end portion of the sales slip beneath the magnifier 16 lens before placing the device 10 on a customer's table, not shown. The customer manually removes the writing instrument 52 from the socket 46 allowing the clip 48 free end portion to move downwardly as viewed in FIG. 2, which closes the microswitch 42 energizing the several LED 40 and illuminating the top surface of the base, the sales slip 60, and the magnifying lens 16 to reveal alpha/numeric indicia printed on the sales slip. The slip may be moved longitudinally under the lens, as the customer desires, to examine the items charged and the total amount payable.

Obviously the invention is susceptible to changes or alterations without defeating its practicability. Therefore, I do not wish to be confined to the preferred embodiment shown in the drawing(s) and described herein.

I claim:

1. An illuminated alpha/numeric line magnifier reading device, comprising:

a planar base having a top surface and opposing sides and end portions;

a generally horizontal support frame connected in cantilever fashion with one end portion of said base and projecting toward the base other end portion in vertically spaced relation with respect to said base;

a pair of legs depending from said support frame adjacent the base other end portion and respective sides of said base;

an elongated magnifying lens extending between said legs in close spaced relation with said base top surface;

a socket on said support frame for normally supporting one end portion of an elongate writing instrument;

electrical circuit means including a switch disposed on the socket and including light emitting members depending from said support frame for illuminating the base top surface and said lens; and, elongated clip means on said socket spring biased toward the writing instrument for closing the switch in the absence of the writing instrument.

2. The reading device according to claim 1 in which the magnifying lens is substantially semicircular in transverse cross section.

3. An illuminated alpha/numeric line magnifier reading device, comprising:

a planar base having a top surface and opposing sides and end portions;

a generally horizontal frame connected in cantilever fashion with one end portion of said base and projecting toward the base other end portion;

pair of legs depending from said frame;

an elongated magnifying lens extending between said legs in close spaced relation with said base top surface; and, electrical circuit means supported by said frame including light emitting members for illuminating the base top surface and said lens.

4. The reading device according to claim 3 and further including:

socket means on said frame for supporting one end portion of an elongate writing instrument; and, a microswitch in said circuit means disposed on said socket means and maintained open by the presence of the writing instrument.

5. The reading device according to claim 4 and further including;

elongate clip means on the socket means spring biased against the writing instrument for closing the microswitch in the absence of the writing instrument.

* * * * *